April 22, 1924.
J. RAISBECK, SR
1,491,422
ADJUSTABLE CHAIN LINK
Filed Feb. 28, 1923
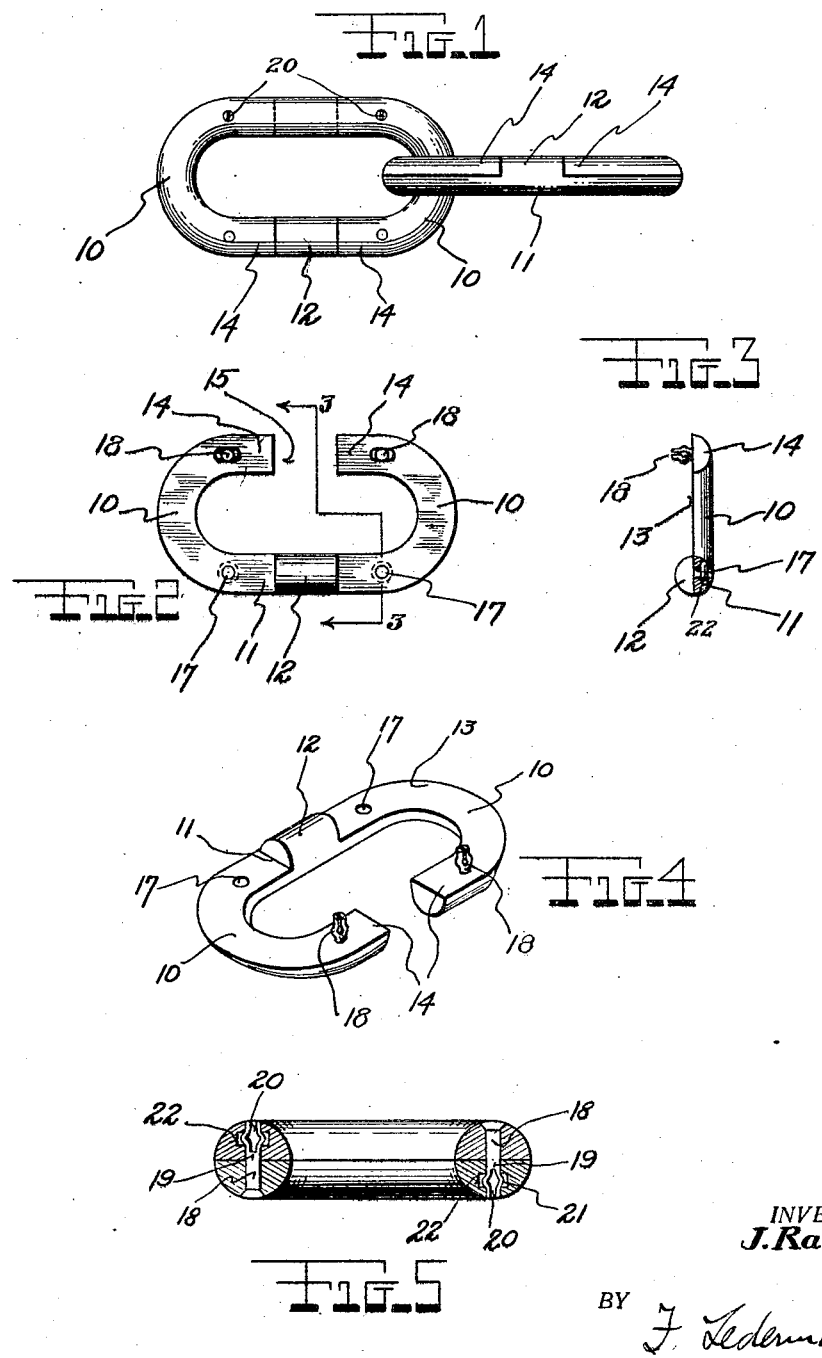
INVENTOR
J. Raisbeck, Sr.,
BY
J. Lederman
ATTORNEY Patented Apr. 22, 1924.

1,491,422

UNITED STATES PATENT OFFICE.

JOSEPH RAISBECK, SR., OF MATHERVILLE, ILLINOIS.

ADJUSTABLE CHAIN LINK.

Application filed February 28, 1923. Serial No. 621,727.

*To all whom it may concern:*

Be it known that I, JOSEPH RAISBECK, Sr., citizen of the United States, residing at Matherville, in the county of Mercer and State of Illinois, have invented certain new and useful Improvements in Adjustable Chain Links, of which the following is a specification.

This invention relates to chain links and the main object is to provide a link which can be readily dismantled so that a chain of any desired number of links may be assembled at the place where it is used without having to resort to the use of a forge or other implements which are generally required for making a chain.

Another object is to provide a chain link composed of two interlocking members which when separated from each other, permit the adjacent chain links to be inserted into the loop of the link which has been dismantled.

Still another object is to provide a chain link which has a modified means provided whereby the members which constitute a link may be releasably secured to each other and without danger of disengaging.

These and other objects will become apparent in the description below, in which characters of reference refer to the like-named parts in the drawing.

Referring briefly to the drawing, Figure 1 is an elevational view of a pair of adjacent chain links interlocked.

Figure 2 is a top plan view of one of the link members.

Figure 3 is a sectional end elevational view of the same taken on line 3—3 of Figure 2.

Figure 4 is a perspective view of one of the link members.

Figure 5 is an enlarged sectional elevational view of a chain link showing the means for securing the link members together.

Referring in detail to the drawing, the numeral 10 indicates the semi-circular curved ends of one of the link members. These curved ends are joined by a straight portion 11, the latter having a semi-circular lug 12 rising from the flat surface 13 intermediate the length of the portion 11. The opposite ends 14 of the curved portions 10 have a gap 15 therebetween which is similar in width to that of the length of the lug 12. The separated ends have pins 18 projecting therefrom, and the opposite sides have holes 17 formed therein which are aligned with the pins 18. Each link comprises two of the members just described, the lug 12 of one member fitting snugly into the gap 15 of the opposite member, the flat faces 13 of both members lying adjacent to each other.

The pins 18 are imbedded in the link members in the usual manner and the ends 19 which project from face 13 each has a longitudinal slit 20 provided, said slit extending the greater part of the length of the projecting end. Intermediate the length of the slitted portion, the pin sections are curvedly bent outward, as indicated by the numeral 21, and away from each other forming a resilient enlargement which may be decreased by closing the slit. The section of the link member which locks with its respective pin has a hole therein, the latter being provided with an annular recess 22, said recess being adapted to receive the enlarged portion of the pin.

The link may be used with various types of chains, a few of which will be mentioned below. When constructing a chain of the endless type used on cranes and similar devices, the length of the chain may be readily added to or reduced by simply adding or removing the desired number of links. This can be accomplished in a simple manner and without the use of tools which are usually required. If a chain is provided with one of these links, and it is desired to break the same, a screw driver or similarly pointed tool can be inserted between the interlocking members which make up a link. This pries the members apart so that the pin 18 of one member is disengaged from the hole 17 of the opposite member. When the link members are separated, they may be readily removed from the chain in an obvious manner. The links when interlocked are releasably retained in such position by the enlarged portions 21 at the slitted end of the pin, said enlarged portion fitting snugly into a recess formed in the corresponding hole of the adjacent link member. When separating a pair of link members, the enlarged portion will be reduced and the slit closed, permitting the pin to readily emerge from the corresponding hole.

I claim:

1. An article of the class described comprising a pair of elongated members having a gap formed at one of their long sides, one surface of said members being semi-circular, the opposite surface being flat, the flat surfaces of said members lying adjacent to each other when both members are interlocked, a semi-circular lug rising from the flat surface of each member and at the opposite side to the gap, said lug of one member being adapted to fit into and close the gap of the opposite member when both members are interlocked, pins rising from the flat surfaces of each member having the projecting ends slitted, the slitted ends being curved outwardly to form resilient enlarged portions, the corresponding holes of the opposite member having annular recesses formed therein, the resilient and enlarged portions of the slitted pins being adapted to be releasably retained in said annular recesses, said pins being adapted to retain the two link members interlocked.

2. An article of the class described comprising a pair of elongated members having a gap separating their ends, one surface of each of said members being semi-circular, the opposite surface being flat, the flat surfaces of said members lying adjacent to each other when both members are interlocked, semi-circular lugs rising from the flat surface of each member on the side opposite to the gap, said lugs of each member being adapted to fit into and close the gap of the opposite member when both members are interlocked, pins rising from the flat surface of each member and having slitted ends, said members having holes receptive of said pins, said holes having annular recesses, and means formed on said pins for engaging the recessed portions of the holes for retaining the link members interlocked.

In testimony whereof I affix my signature.

JOSEPH RAISBECK, Sr.